Patented Feb. 27, 1923.

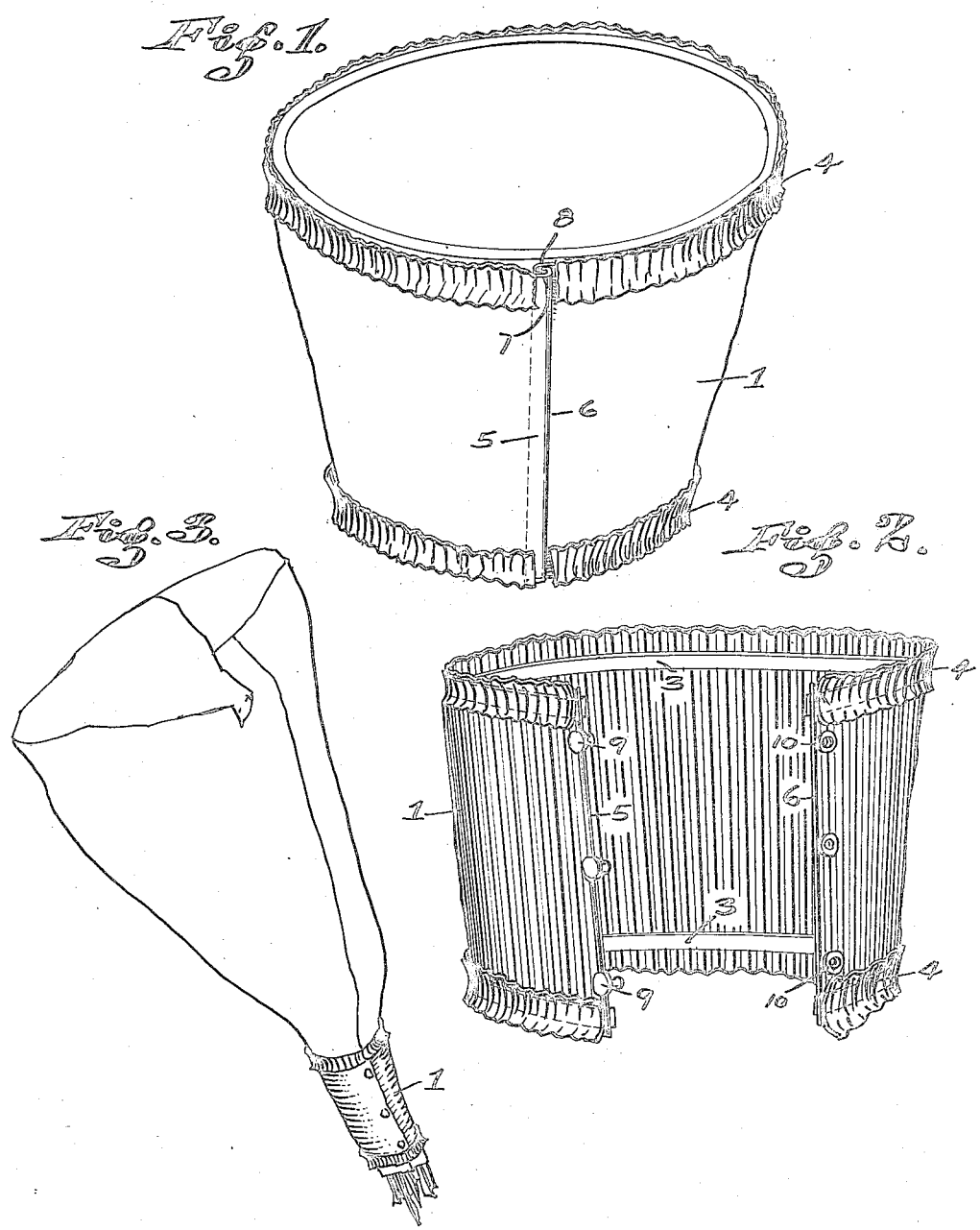

1,446,563

UNITED STATES PATENT OFFICE.

FRANCES T. HUGHES, OF BERKELEY, CALIFORNIA.

DECORATIVE COVERING FOR FLOWERPOTS, BOUQUETS, AND THE LIKE.

Application filed July 25, 1922. Serial No. 577,298.

*To all whom it may concern:*

Be it known that I, FRANCES T. HUGHES, a citizen of the United States, and a resident of the city of Berkeley, county of Alameda, State of California, have made a new and useful invention, to wit: Improvements in Decorative Coverings for Flowerpots, Bouquets, and the like; and I do hereby declare the following to be a full, clear, concise, and exact description of the same.

This invention relates particularly to a decorative and ornamental covering for flower pots, bouquets and the like for effecting an esthetic appearance on articles essentially utilitarian.

An object of the invention is to provide a decorative covering that may be removably arranged around flower pots and the like to cover up the unsightly exterior of the same together with the discolorations caused by water seepage.

A further object of this invention is to provide a decorative covering that may be secured around bouquets and the like as a protection and as a preventive to the moistening of the hand with water or stem stains. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings,

Figure 1 represents a perspective of a flower pot having a covering arranged thereon and constructed in accordance with my invention.

Figure 2 is a somewhat modified form of the invention shown in Figure 1.

Figure 3 is a perspective view of a wrapped bouquet having my covering mounted around the stem end thereof.

In detail, the construction illustrated in the drawings comprises a substantially rectangular sheet 1 of flexible and resilient material formed either of paper, fabric or sheet rubber or any other equivalent material treated with paraffine, oil or the like so as to be impervious to water. In the practice of my invention, I have found that when the covering is applied to the exterior of flower pots, (which are usually more or less in an unsightly moistened condition and have a tendency to become discolored) that the moisture on the pot that contacts with the covering material tends to rot or destroy the body thereof, except in the event that the covering be treated so as to be impervious.

Material such as paper or cloth may be utilized, making it necessary to have the same of a size which will conform exactly to the circumference of the article to which it may be attached. With the use of rubber sheeting or any other equivalent flexible and resilient material, variations in size can be dealt with by stretching the material to a desired fit.

The covering, when made of rubber, would preferably be pleated, as shown in Figure 2, and the pleats held in form by elastic marginal edges 3, adjacent the upper and lower edges of the covering,—a suitable ornamental edging 4 being placed around the exterior of the upper and lower edges to give the same a fancy appearance.

The covering when made either of plain flat material, as shown in Figure 1, or pleated, as shown in Figure 2, has the opposite side edges 5 and 6 provided with means thereon whereby the respective end edges may be removably joined together. In Figure 1, the end edges 5 and 6 are each provided with inter-locking hook shaped, non-elastic strips 7 and 8 extending the entire length thereof, which will remain in engagement through the tension exerted by slightly stretching the covering in placing it around an article. In Figure 2, male and female glove snap fasteners 9 and 10 would be placed in and through the respective opposite end edges 5 and 6 whereby said ends might be detachably engaged one with the other.

The form of device shown in Figure 2 when reduced in size could be effectively used in the manner illustrated in Figure 3.

Having thus described this invention, what I claim and desire to secure by Letters Patent is:—

1. A decorative covering for flower pots, bouquets and the like, comprising a sheet of flexible material, provided with binding strips adjacent the upper and lower edges thereof, and having means for removably joining the opposite end edges together when placed around flower pots, bouquets and the like.

2. A decorative covering for flower pots, bouquets and the like, comprising a sheet of resilient material, marginal strips adjacent the upper and lower edges thereof, and marginal strips on the opposite side edges of said material adapted to be removably joined in proximate relationship around flower pots, bouquets and the like.

3. A decorative covering for flower pots, bouquets and the like, comprising a sheet of flexible material having marginal strips on the opposite side edges of said material adapted to be removably joined in proximate relationship around flower pots, bouquets and the like.

4. A decorative covering for flower pots, bouquets and the like, comprising a sheet of resilient and flexible material, impervious to water, provided with elastic binding strips adjacent the upper and lower edges thereof and having means for removably joining the opposite end edges together when placed around flower pots, bouquets and the like.

5. A decorative covering for flower pots, bouquets and the like, comprising a sheet of resilient material, impervious to water; elastic marginal strips adjacent the upper and lower edges thereof and non-elastic marginal strips on the opposite side edges of said material adapted to be removably joined in proximate relationship around flower pots, bouquets and the like.

In testimony whereof, I have hereunto set my hand at San Francisco, California, this 20th day of July, 1922.

FRANCES T. HUGHES.

In presence of:—
  LINCOLN V. JOHNSON.